…

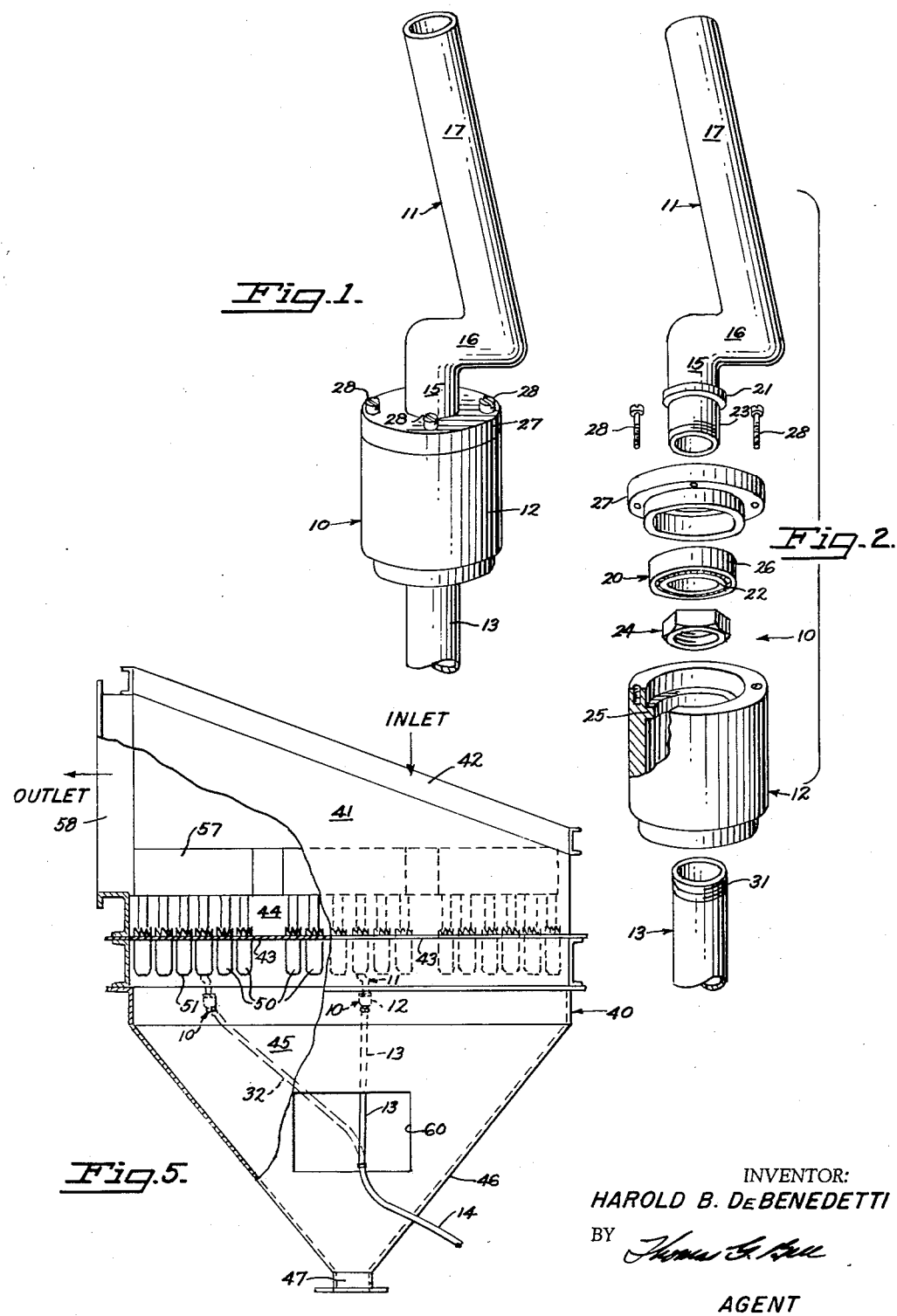

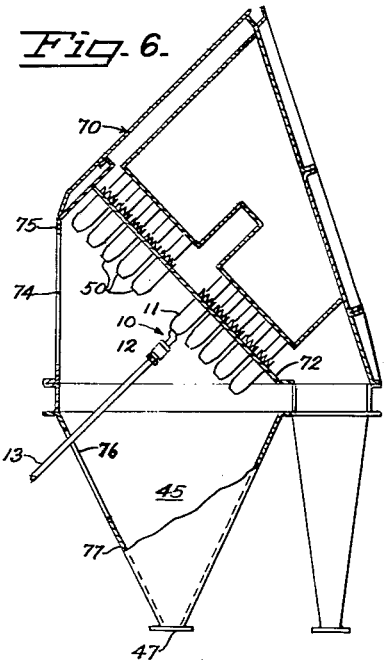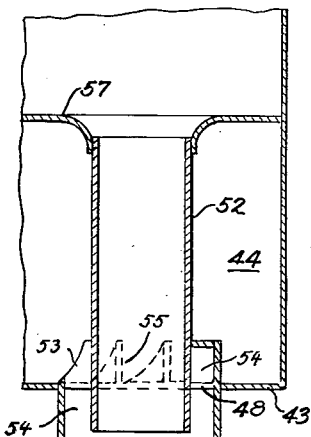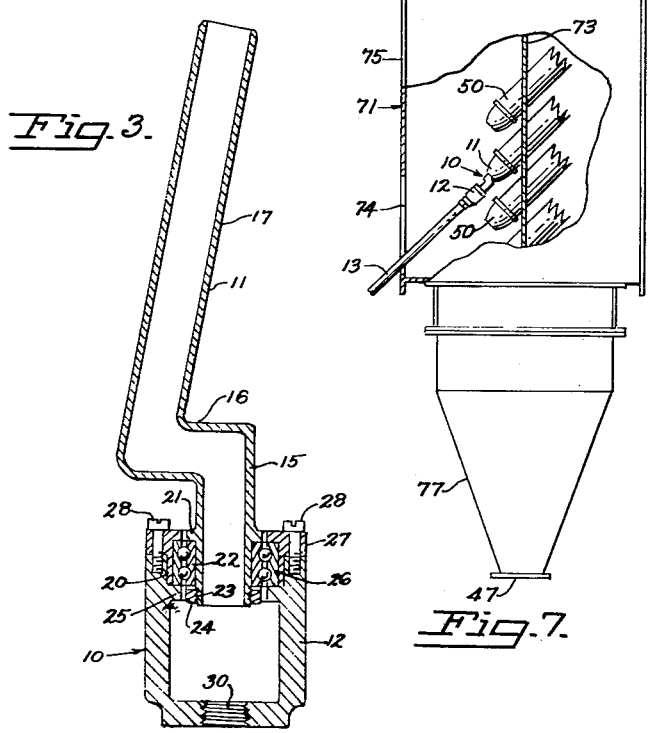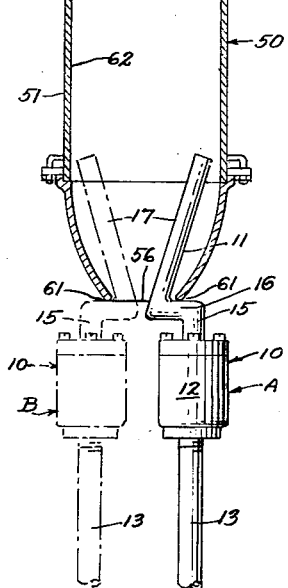

United States Patent Office 3,000,036
Patented Sept. 19, 1961

---

3,000,036
CLEANING TOOL
Harold B. De Benedetti, Concord, Calif., assignor to Tidewater Oil Company, Los Angeles, Calif., a corporation of Delaware
Filed Aug. 12, 1959, Ser. No. 833,273
10 Claims. (Cl. 15—314)

This invention relates to a specialized type of pneumatic cleaning device. More particularly, this invention relates to a manually operated pressure nozzle for blowing accumulated dust and debris from the collector tubes of a multi-tube centrifugal dust collector.

Because of the air pollution associated with heavy industrialized areas, many large cities have enacted ordinances requiring industries to curtail the amount of polluting materials, such as dust and smoke, which they release to the atmosphere. One device that is widely used for curtailment of air pollutants is a multi-tube centrifugal collector of the type disclosed in Patents Nos. 2,281,610, 2,360,355, 2,546,246, and 2,717,054, wherein long cylindrical tubes are located side by side and in the path of the flue gases emanating from a furnace. For example, a stoker-fired boiler furnace using finely-ground or pulverized fuel emits smoke that carries with it a quantity of fine dust particles and ash. This smoke is sent down into the tubes while having a whirling motion imparted to it, as by a set of vanes or ramps inclined to define a set of short helical ducts. The resulting centrifugal force separates out the dust particles, ash, and other solids, which fall down and are collected in a bin beneath the tubes. Since the device very efficiently removes the undesirable air-pollutants at a very economical price, it is in wide use throughout the industrial world.

However, from the use of this device has arisen a problem costing much time and money and sometimes necessitating large-scale shutdowns of entire plants. This problem is that of cleaning the helical ducts or other inlet areas leading into or out of the numerous tubes in this centrifugal dust collector. Often, a single device has thousands of tubes, each with several ramps or vanes. The ash and other solid matter has a tendency to collect on these vanes, which are located in a narrow annular space. Collected material soon impairs the efficiency of the tubes and eventually can completely close off the tubes from the furnace. When this happens to a sufficient percentage of tubes, the tubes have to be cleaned out, often necessitating shutting down the furnace and waiting until the collector cools enough so that a man can enter the device and clean out the vanes, which are inevitably located in cramped quarters and are hard to get at. Furthermore, it has taken a long time to clean out each tube and its vanes, for there has not heretofore been any instrument which could satisfactorily, conveniently, and swiftly clean them out.

One object of this invention is to provide a device that will quickly, easily, and thoroughly dislodge the accumulation in the vanes or ramp passages and the tube walls of tubular collectors.

Another object of the invention is to provide a cleaning tool which can be manipulated from the outside of a multi-tube centrifugal collector to direct a current of compressed air up into the tubes and through the vanes to blow the collected solids loose.

Another object of the invention is to provide a way of cleaning the tubes in a hot, multi-tube centrifugal collector without the customary cooling-down period, by eliminating the need for the operator to climb into the collector to clean the tubes therein.

These objects are achieved by a novel hand-operated, pneumatic tool, which quickly and efficiently removes the accumulated dust and debris from the tubes in a multi-tube centrifugal collector. The new tool delivers compressed air through a novel-shaped nozzle and provides for ready rotation of the nozzle by movement of the tool handle. The nozzle is made to travel completely around the inside of the clogged tube while delivering the compressed air in a steady stream against the deposits of solid material. The nozzle is pointed at all times at an angle so that a forceful stream of air goes directly up through all the vane passages and blows out the plugging material. The device is operated from outside the collector at a point sufficiently removed from the hot tubes to enable the user to clean the tubes while they are still hot.

Other features of the invention, along with additional objects and advantages, will appear from the following description of a preferred embodiment thereof.

In the drawings:
FIG. 1 is a view in perspective of a tool embodying the principles of this invention.
FIG. 2 is an exploded view in perspective of the tool, showing its components and their relation to each other.
FIG. 3 is a view in elevation and in vertical section of the tool.
FIG. 4 is a fragmentary view in elevation and in vertical section of one tube in a standard multi-tube centrifugal collector, showing the tool inserted in the lower end in position for cleaning the tube. Broken lines show the same tool in another position, halfway around the rim of the tube.
FIG. 5 is a view in side elevation, partially broken away, of a conventional horizontal multi-tube centrifugal collector with the tubes mounted vertically and showing the tool being used to clean one of these tubes. Broken lines show the same tool in use on another tube.
FIG. 6 is a view in elevation and in vertical section of another type of multi-tube centrifugal collector where the tubes are inclined from the vertical, showing how the tool is used to clean these tubes.
FIG. 7 is a view in side elevation of yet another type of multi-tube centrifugal collector, partially broken away to show the tool being used therein.

As illustrated in the drawings, the tool 10 comprises a generally Z-shaped nozzle 11 rotatably mounted in one end of a cylindrical housing 12. An elongated tubular handle 13 is attached to the other end of the housing 12, so that the nozzle 11 is freely rotatable with respect to the handle 13, and through the handle 13 is sent compressed air from a conduit 14 that is attached to the lower end of the handle.

The nozzle 11, preferably made from steel or iron pipe, has an axial portion 15, which is aligned with the axis of the housing 12, a radial offsetting or transverse portion 16, which extends perpendicularly to the portion 15, and an inclined terminal portion 17, which extends in a straight line from the outer end of the portion 16 back to or substantially to the axis of the housing 12. While the exact inclination of the terminal portion 17 depends on the dimensions of the cylinders to be cleaned, the portion 17 will generally lie at an inclination of between 10° and 25° to the axis. The importance of this novel configuration will be made clearer after the rest of the tool 10 has been described. In a typical tool 10, the portions 15 and 16 are about the same length, and the terminal portion 17 is about four times as long.

The rotational connection between the nozzle 11 and the housing 12 is preferably made by some anti-friction means, such as a double-row ball bearing 20, to give as great freedom of rotation as possible while maintaining correct alignment of the parts. In this instance, the nozzle portion 15 is shown with an annular flange 21 that abuts one end of the bearing's inner race 22. At its lower end 23 the nozzle 11 is exteriorly threaded so that a nut 24 can be tightened against the other end of the inner race 22. The housing 12 is provided with an annular shoulder 25, against which the outer race 26 of the bearing 20 seats. A stepped cap 27 is secured to the housing 12, as by cap screws 28, and holds the outer race 26 in place. Thus the nozzle 11 is freely rotatable with respect to the housing 12.

A double-row bearing 20 is preferable, to accommodate both axial and radial forces. However, a single-row bearing is operable, though less desirable since it is less able to withstand axial forces and some axially exerted pressure is required to maintain the nozzle 11 in an abutting relationship to the tube being cleaned, as will be explained presently.

The lower end of the housing 12 may be provided with a threaded opening 30 to receive a threaded upper end 31 of the handle 13. The handle 13 may be straight or may have a bend, as in the alternative handle 32. The length depends on the convenience of the particular installation, and two or more different handles may be used with the same tool 10, if desired, to suit the convenience of the operator. If one handle 13 is enough, it may be welded to the housing 12, but where several interchangeable handles are to be used, threading is preferred. Then, a short handle may be used for cramped quarters, a long handle to reach more distant tubes, and a handle having a bend where that is helpful.

A brief description of a centrifugal dust collector 40 as shown in FIGS. 4 and 5 will aid in understanding how the tool 10 is used. The collector 40 has a main housing 41 with the top 42 open to provide an inlet. A horizontal partition 43 divides the housing 41 into an inlet chamber 44 above the partition and a bottom chamber 45, the lower end of the housing 41 defining a hopper 46 from which the solids are removed through a bottom opening 47. The partition 43 is perforated by numerous round openings 48, and in each opening is mounted a centrifugal collector or precipitation tube 50. Actually, each collector tube 50 comprises two tubes: a larger diameter lower tube 51 and a smaller-diameter upper tube 52 (FIG. 4), which are spaced apart by helical ramps or vanes 53 to provide downwardly spiraling passages 54. These passages 54 introduce the gas into the precipitation tube 50 and initiate rotation of the gas stream. The gas enters the collector tube 50 by flowing over the side rather than the top of the ramps 53 into side vertical inlets 55, thereby imparting a relatively tangential directional flow to the dust and gas stream. The gas spirals down into the tube 51, where the dust is centrifugally separated from the gas, the dust and ashes falling out the bottom outlet 56 into the hopper 46 while the purified gas then ascends the tube 52 and passes through manifolds 57 to outlets 58.

The trouble has been that some of the dust, ashes, etc. became separated out along the ramps 53 and built up deposits in the spiral passages 54, which eventually tended to plug and render the tubes 50 inoperative. Deposits also build up on the side walls of the lower tube 51. For a man to get directly at the vanes or ramps 53, the furnace had to be shut down, so that a man could get down into the cramped chamber 44, standing on the partition 43. Even then, it was very difficult to clean the vanes and it was a long job.

In accordance with the present invention, the tool 10 is inserted, either through a trap door 60 in the hopper 46 or through the bottom opening 47. The transverse section 16 of the nozzle 11 is brought up against the rim 61 of the lower tube 51, with the terminal section 17 up in the tube 51, and the operator then moves the handle 13 in a circular path, either clockwise or counter-clockwise. As the handle 13 is moved, the nozzle 11 revolves within the rim 61, moving in its bearing 20 and always maintaining contact with the rim 61, as illustrated in FIG. 4. Two positions of the tool 10 are shown there, designated A and B. Mere movement of the handle accomplishes this revolution and the nozzle end 17 is always pivoted in the right direction. The handle 13 being of suitable length, there is no need for the operator to reach up inside the collector 40, let alone actually climb inside. With a firm handle 13 of sufficient length mounted between the tool housing 12 and the compressed air hose 14, all the tubes 50 may be cleaned without entering into the collector 40. Strategic placing of the trap doors 60 gives quick and direct access to all of the tubes 50, regardless of how many there are or how they are arranged in the collector 40.

The configuration of the nozzle 11 of my cleaning tool is of particular importance, for by virtue of the inclination and offset of the elongated terminal section 17, the stream from the nozzle 11 can be caused to sweep around the inner wall 62 of the collector tube 51 to deliver a stream of compressed air directly into the passages 54 between the ramps or vanes 53. This sweeping action is obtained, after section 17 is inserted in tube 51, by maintaining contact between rim 61 and the junction of sections 16 and 17 as the handle 13 is moved to work the tool around the inside of the rim 61. A stream of compressed air might be directed along a generally axial course through the tube 51 by putting an air hose into the bottom opening 56 of the tube 50, but if this were done the air would merely pass through the central part of the collector tube 51 and out via the outlet pipe 52 without dislodging much, if any, of the accumulated debris on the walls 62 of the tube 51 and without substantially affecting the accumulation in the passages 54. The path of the compressed air emanating from the nozzle 11 of my cleaning tool 10 is along the inner wall 62 of the collector tube 51 and directly against the accumulation of contaminant which lies in the passages 54. Since the greatest amount and most troublesome accumulation is at this position, the stream of air emanating from my cleaning tool 10 strikes at the heart of the problem, and a much superior cleaning procedure is provided. The dislodged dirt falls down through the tubes 51 and into the hopper 46 or, if blown out on the partition 43, is carried into the hopper 46 during the first few moments of operation of the tubes 50.

As illustrated in FIG. 5, the conventional horizontally disposed bank of tubes 50, such as found in either the side-inlet, top-outlet, or top-inlet, side-outlet dust collectors is readily cleaned by insertion of my cleaning tool through the trap door 60. The hopper 46 takes the form, generally, of an inverted truncated pyramid, so that in effect these trap doors 60 may be situated on all four sides thereof and at a position on each of the sides giving ready access to the most closely adjacent tubes 50. Also, handles 32 with a bend may be used.

FIGS. 6 and 7 illustrate conventional decantation apparatus 70 and 71 where the banks of collector tubes 50 are mounted at an angle to the horizontal, either in an inclined partition 72 or a vertical partition 73. The tool 10 can as easily be used in these types of arrangements, through a trap-door 74 on the vertical side wall 75 of the housing, or through a trap-door 76 on the sloping lower side of the bin 77. The tubes 50, therefore, need not be vertically disposed but may, in fact, be positioned in any manner, just so long as the bottom openings thereof are accessible from the outside.

Although the tool 10 has been illustrated in connection with a particular use, it is apparent that other uses may be made of the invention and it is therefore not intended to limit its use. Wherever the need arises for cleaning or otherwise treating an area with a fluid such as compressed air delivered through a nozzle and requiring the nozzle to be revolved around the inside of a circle, the invention proves highly satisfactory. Furthermore, instead of compressed air, any type of fluid may be delivered through my tool 10, such as steam, water, mineral oils or other liquids which are desired to be delivered in the manner provided by the operation of the device.

To those skilled in the art to which this invention relates, changes in construction and differing embodiments and applications of the invention will suggest themselves without departing from the spirit and scope of the invention. The disclosures and the description herein are illustrative and are not intended to be in any sense limiting.

I claim:

1. A cleaning tool for employing a stream of fluid under pressure, comprising: a tubular elongated handle and a tubular nozzle having an axial portion rotatably mounted with respect to said handle, a radially extending offset portion, and an inclined terminal portion with its axis extending generally axially back toward the axis of said axial portion.

2. A device for directing a fluid stream, comprising: a cylindrical tube, a tubular nozzle having an axial portion rotatably mounted at one end of said tube, a radially extending offset portion rigidly connected to said axial portion, an inclined terminal portion rigidly connected to said offset portion and having its axis extending back toward the axis of said axial portion, and means at the other end of said tube for sending fluid under pressure into said tube and through said nozzle.

3. A tool for delivering a pressurized stream of fluid, said tool being capable of ready movement in a circular pattern, comprising: relatively short tubular housing; a relatively long stepped-shaped tubular nozzle having an axial portion rotatably and removably mounted at one end of said housing, an offset portion rigidly connected to said axial portion, and a long inclined generally axial nozzle outlet tube rigidly connected to said offset portion and having its axis extending toward the axis of said axial portion; a length of rigid tubular conduit connected to the other end of said housing; and a flexible conduit connected to said rigid conduit for supplying it with said fluid, so that there is a sealed continuous passageway from the said flexible conduit to the nozzle exit.

4. A tool for cleaning the interior of a tubular member with a pressurized stream of fluid, comprising: a relatively long stepped-shaped tubular one-piece rigid nozzle having an axial portion, a short radial offset portion, and a long inclined generally axial nozzle outlet tube of substantially constant inner diameter having its axis extending from the offset toward the axis of said axial portion; a length of rigid tubular conduit rotatably connected to said nozzle; and a flexible conduit connected to said rigid conduit, forming a sealed continuous fluid passageway to the nozzle exit, whereby said nozzle outlet tube is inserted in the tubular member to be cleaned with said offset portion bearing against the lower rim of said member, said nozzle sending a stream of fluid generally axially but toward the wall of said member, said rigid conduit then being moved in a circular path to impart rotation to said nozzle and move it around said member so that the fluid is directed around the interior surface of said member.

5. A device for sending a stream of compressed air into a tubular enclosure having a lower opening and a rim around the opening and walls thereabove, the device being moved in a circular path to direct the stream around the walls, comprising: a ball-bearing having an inner race and an outer race, a relatively long and slender step-shaped tubular one-piece rigid nozzle secured to one said race, said nozzle having an axial portion connected to said one race and an inclined outer portion extending back toward the axis of said axial portion, a tubular housing connected to the other said race, and conduit means connected to the other end of the housing, the step on said nozzle being adapted to engage said rim while the nozzle extends up into said tubular enclosure.

6. A cleaning tool for sending a stream of compressed air into a tubular enclosure having a lower opening and a rim around the opening and a cylindrical wall thereabove, said tool being moved in a circular path to direct the stream successively against the complete circuit of the wall, said tool comprising: an axial inlet portion, a radial offset portion rigidly connected to said inlet portion and a long inclined terminal portion rigidly connected to said offset portion and having its axis extending back to the axis of said axial portion; a short tubular housing partially enclosing said axial portion, anti-friction bearing means connecting said nozzle to one end of said housing for free rotation therewith; and a length of rigid tube attached to the other end of said housing, said tube serving as a handle for manipulating said nozzle and as a conduit for compressed air, said terminal portion of the nozzle being inserted in said enclosure with said offset portion bearing against said rim, planetary movement of the handle then serving to rotate said nozzle.

7. The tool of claim 6 wherein the axis of the nozzle terminal portion is inclined at an angle of about 10° to 25° to the axis of the axial portion.

8. The tool of claim 6 wherein the anti-friction device comprises a double-row ball bearing.

9. The tool of claim 6 wherein the tube serving as a handle is bent to enable access to off-center enclosures.

10. The device of claim 6 wherein the length of the section of nozzle between the bearing housing and the radial offset portion and the radial offset portion itself are substantially the same magnitude, and the remaining section of nozzle is approximately four times the length of one of the other sections.

References Cited in the file of this patent

UNITED STATES PATENTS

| | | |
|---|---|---|
| 691,718 | Goodfellow | Jan. 21, 1902 |
| 912,493 | Sanders | Feb. 16, 1909 |
| 1,139,911 | Shepler et al. | May 18, 1915 |
| 1,658,311 | Tonso | Feb. 7, 1928 |
| 1,779,177 | Long | Oct. 21, 1930 |
| 1,829,174 | Whelan et al. | Oct. 27, 1931 |
| 1,923,425 | Diederich | Aug. 22, 1933 |
| 2,319,682 | Hibner et al. | May 18, 1943 |
| 2,326,525 | Diwoky | Aug. 10, 1943 |
| 2,607,622 | Doepke | Aug. 19, 1952 |
| 2,655,455 | Steele | Oct. 13, 1953 |

FOREIGN PATENTS

| | | |
|---|---|---|
| 1,005,629 | France | Apr. 15, 1952 |